United States Patent
Tomioka et al.

(10) Patent No.: US 11,740,845 B2
(45) Date of Patent: Aug. 29, 2023

(54) RIP SIMULATION DEVICE AND RECORDING MEDIUM HAVING RIP SIMULATION PROGRAM RECORDED THEREON

(71) Applicant: SCREEN HOLDINGS CO., LTD., Kyoto (JP)

(72) Inventors: Sho Tomioka, Kyoto (JP); Hiroyuki Segawa, Kyoto (JP); Yohei Onuki, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 17/795,441

(22) PCT Filed: Feb. 12, 2021

(86) PCT No.: PCT/JP2021/005234
§ 371 (c)(1),
(2) Date: Jul. 26, 2022

(87) PCT Pub. No.: WO2021/172052
PCT Pub. Date: Sep. 2, 2021

(65) Prior Publication Data
US 2023/0089088 A1    Mar. 23, 2023

(30) Foreign Application Priority Data
Feb. 27, 2020  (JP) ................ 2020-031385

(51) Int. Cl.
*G06F 3/12* (2006.01)
(52) U.S. Cl.
CPC .......... *G06F 3/1256* (2013.01); *G06F 3/1208* (2013.01); *G06F 3/1211* (2013.01); *G06F 3/1219* (2013.01); *G06F 3/1204* (2013.01)

(58) Field of Classification Search
CPC .... G06F 3/1256; G06F 3/1208; G06F 3/1211; G06F 3/1219; G06F 3/1204; G06F 3/12; B41J 5/30; H04N 1/00
(Continued)

(56) References Cited

U.S. PATENT DOCUMENTS

| | | | |
|---|---|---|---|
| 2009/0025123 A1* | 1/2009 | Weedlun | B44C 1/1712 2/244 |
| 2014/0085657 A1 | 3/2014 | Segawa et al. | |
| 2019/0138256 A1* | 5/2019 | Kahwaji | G06F 3/1285 |

FOREIGN PATENT DOCUMENTS

| | | |
|---|---|---|
| JP | 2005-178138 A | 7/2005 |
| JP | 2013-088867 A | 5/2013 |

(Continued)

OTHER PUBLICATIONS

International Search Report issued in corresponding International Patent Application No. PCT/JP2021/005234, dated May 11, 2021, with English translation.

*Primary Examiner* — Darryl V Dottin
(74) *Attorney, Agent, or Firm* — McDermott Will & Emery LLP

(57) ABSTRACT

A RIP simulation device that enables a rapid grasp of a part having a problem in RIP speed and a specific detail of the problem is achieved. While the RIP prediction screen is displayed on a display unit, the result display control unit causes the display unit to display a sheet number corresponding to a position that is on a line graph representing a predicted RIP time for each sheet and is being designated by an input operation unit. When a sheet number displayed on the display unit is selected by the input operation unit, the result display control unit causes the display unit to display an analysis result screen indicating an analysis result related to the page corresponding to the sheet number on the basis (Continued)

of the correspondence relationship between sheets and pages when print output is actually executed.

11 Claims, 17 Drawing Sheets

(58) Field of Classification Search
USPC .......................................................... 358/406
See application file for complete search history.

(56) References Cited

FOREIGN PATENT DOCUMENTS

| | | |
|---|---|---|
| JP | 2014-067217 A | 4/2014 |
| JP | 2014-106762 A | 6/2014 |
| JP | 2017-189952 A | 10/2017 |

* cited by examiner

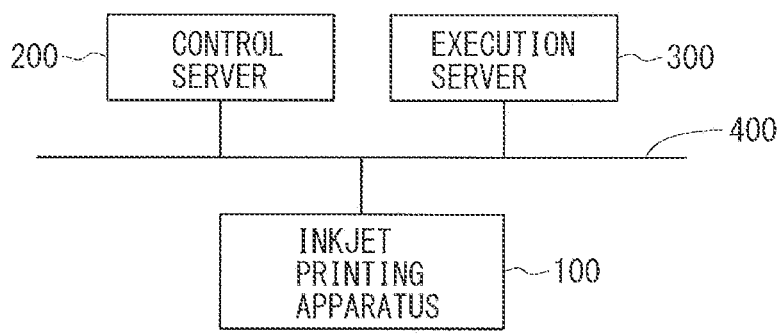
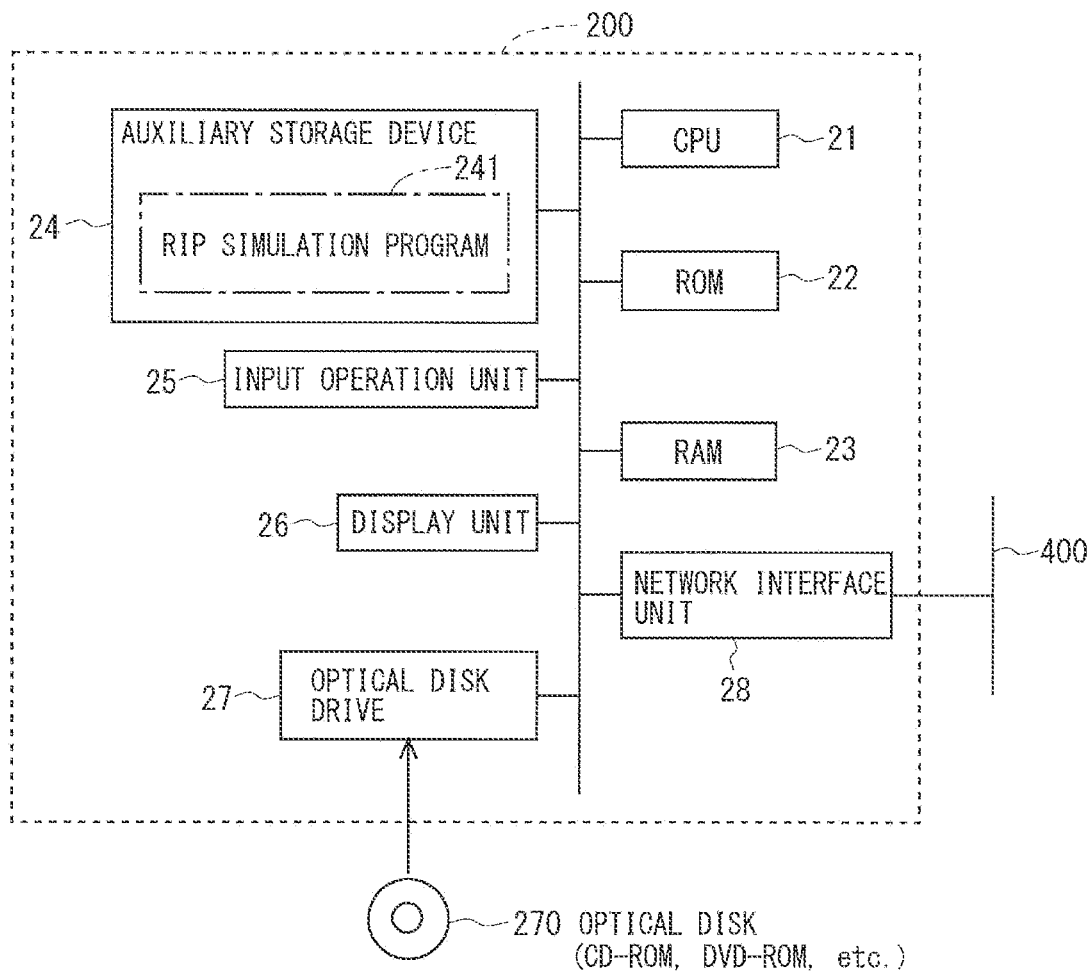

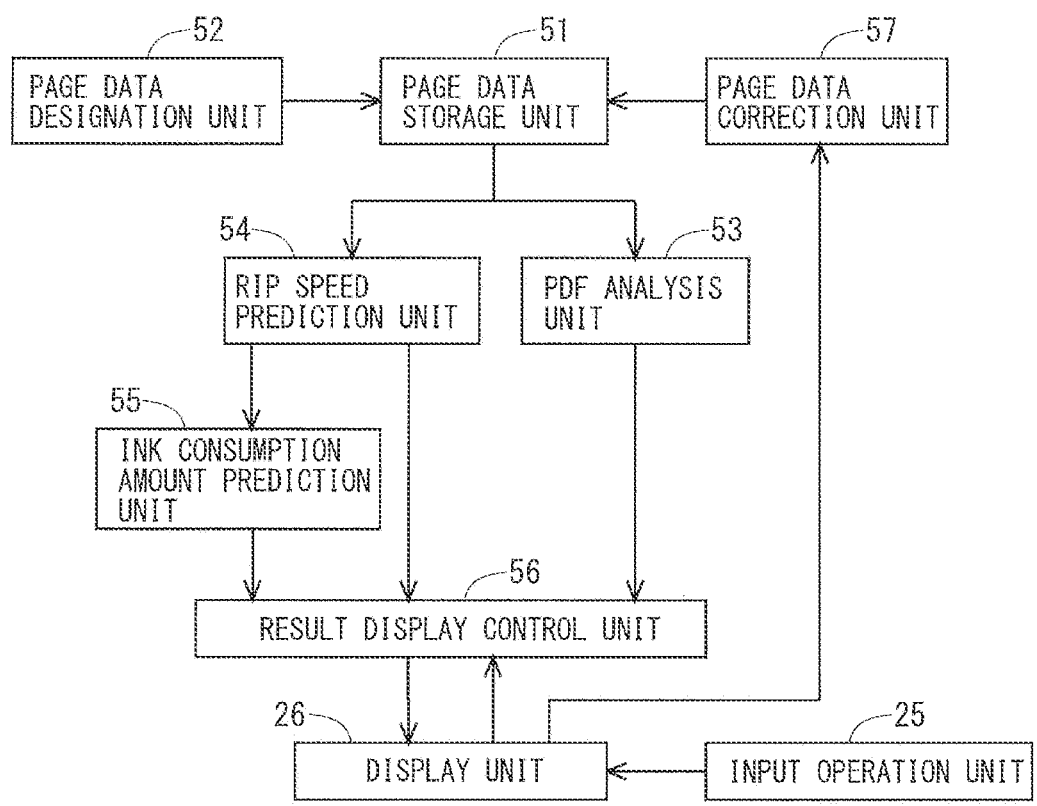

Fig.6

| JOB LIST | | | | | |
|---|---|---|---|---|---|
| JOB NAME | REGISTRATION DATE/TIME | FUNCTION | | ANALYSIS RESULT | SIMULATION RESULT |
| | | 601 | 602 | | |
| BOOK-1 | 2020/1/6 13:47:27 | | | Warning | Error |
| CATALOG33 | 2019/12/26 14:26:10 | | | Error | Error |
| CARD.xyz | 2019/12/26 13:03:34 | | | | |
| SONG(70) | 2019/12/25 18:17:24 | | | Warning | |
| BOOK-2 | 2019/12/25 10:59:51 | | | | Warning |

| 621 | 622 | 623 | 624 |
|---|---|---|---|
| ALL | RIP SPEED PREDICTION | INK CONSUMPTION AMOUNT PREDICTION | PRINTER INFORMATION |

625

| BASIC INFORMATION | |
|---|---|
| JOB NAME | BOOK-1 |
| JOB ID | P0015397 |
| PRINTER MODEL NAME | JET003 |
| REPORT CREATION DATE/TIME | 2020/1/16 11:22:33 |
| ⋮ | ⋮ |

626

| RIP SPEED PREDICTION | |
|---|---|
| TOTAL NUMBER OF SHEET | 110 |
| PRINTING SPEED [mpm] | 120 |
| PREDICTED SPEED (FRONT) [mpm] | 607.1 |
| PREDICTED SPEED (BACK) [mpm] | 620.3 |
| RESULT | NO PROBLEM |
| SIMULATION GRAPH | FRONT ~71<br>BACK ~72 |

627

| INK CONSUMPTION AMOUNT PREDICTION | | | |
|---|---|---|---|
| NUMBER OF COPIES | 1 | | |
| SHEET NUMBER | 110 | | |
| INK | Total | Front | Back |
| Black | 0.574 | 0.295 | 0.279 |
| Cyan | 0.026 | 0.013 | 0.013 |
| ⋮ | ⋮ | ⋮ | ⋮ |

628

| PRINTER INFORMATION | |
|---|---|
| PRINTER MODEL NAME | JET003 |
| PRINTING CONDITION | XYZ_600×450dpi |
| ⋮ | ⋮ |

Fig.12

| ANALYSIS RESULTS | | |
|---|---|---|
| IMPORTANCE | ANALYSIS NUMBER | PROBLEM |
| IMPORTANT | 10 | SOME FONTS ARE NOT EMBEDDED. |
| WARNING | 3 | TRANSPARENT COMPONENT IS BEING USED FOR PATTERN. |
| WARNING | 22 | TOTAL SIZE OF IMAGE DATA IS 1024 MB OR MORE. |
| INFORMATION | 35 | PLURALITY OF FONTS ARE BEING USED. |

640, 641

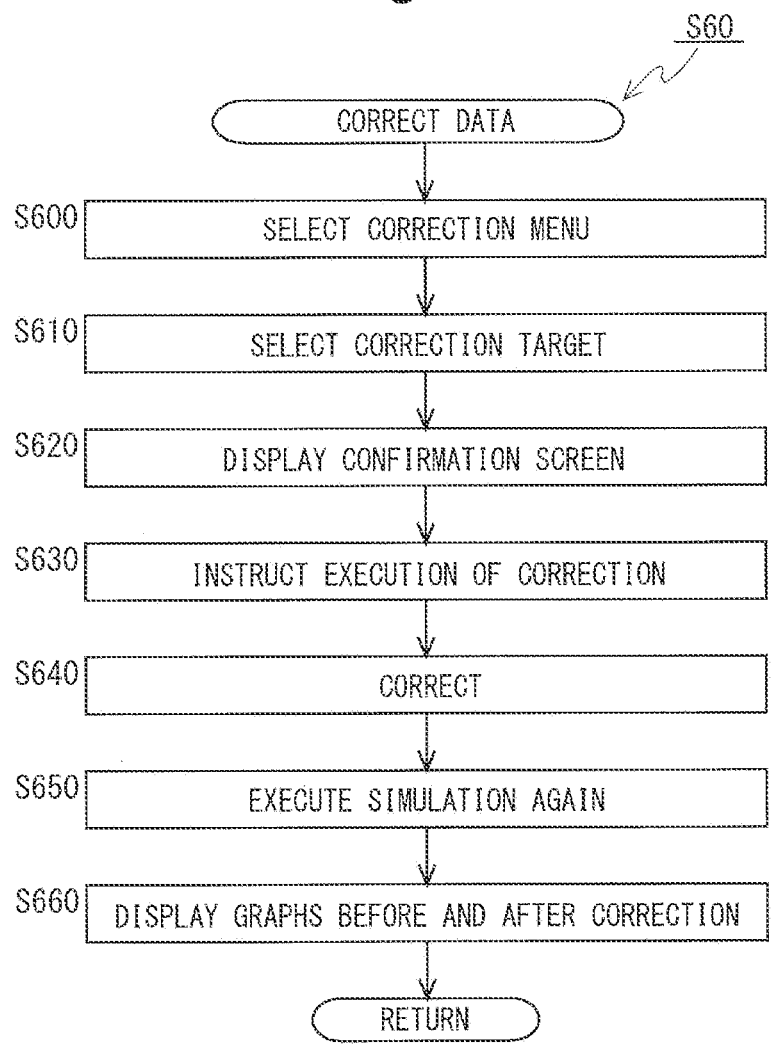
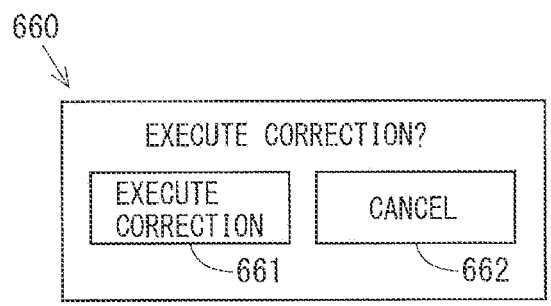

Fig.20

| PAGE | ANALYSIS NUMBER | PROBLEM |
|---|---|---|
| 3 | 13 | THERE ARE PAGES OF DIFFERENT SIZES. |
| Total 25 | 32 | 30 OR MORE PATTERNS ARE BEING USED. |
| Total 12 | 8 | IMAGE WITH 10 MB OR MORE IS BEING USED. |
| .... | .... | .... |

Fig.21

| ANALYSIS NUMBER | CORRESPONDING PAGE |
|---|---|
| 32 | 1, 3, 6, 15–24, 30, 33, 36, 51, 66, 69, 73, 81, 100, 103, 110, 124 |
| 8 | 15, 22, 24, 31, 46, 61, 80, 100, 102, 122, 150, 152 |
| ⋮ | ⋮ |

RIP SIMULATION DEVICE AND RECORDING MEDIUM HAVING RIP SIMULATION PROGRAM RECORDED THEREON

CROSS REFERENCE

This application is the U.S. National Phase under 35 US.C. § 371 of International Application No. PCT/JP2021/005234, filed on Feb. 12, 2021, which claims the benefit of Japanese Application No. 2020-031385, filed on Feb. 27, 2020, the entire contents of each are hereby incorporated by reference.

TECHNICAL FIELD

The present invention relates to a raster image processor (RIP) simulation device that performs RIP processing for converting data created using desktop publishing (DTP) software or the like into image data in a bitmap format for print output in a device different from a device that performs actual RIP processing, and a RIP simulation program.

BACKGROUND ART

In a printing system in which processing by a workflow is performed, first, editing processing using components or the like constituting printed matter is performed using DTP software or the like in a computer (e.g., personal computer) called a front end. Through the editing processing, page data (e.g., Postscript file or portable document format (PDF) file), in which a print target is described in a page description language or the like, is created. Next, RIP processing (rasterization processing) is performed on the page data. As a result, the page data is converted into print data that is image data in a bitmap format representing an image to be printed. Then, the print data is sent to a digital printer (e.g., inkjet printing apparatus), and printing based on the print data is performed by the digital printer. Alternatively, a printing plate is produced by a plate making apparatus using the print data, and printing is performed by a plate printer using the printing plate.

In such a printing system, conventionally, a time required for RIP processing (hereinafter simply referred to as "RIP time") has been predicted for the purpose of efficiently using resources such as a printer. In this regard, Japanese Laid-Open Patent Publication No. 2014-67217 discloses a technique for accurately predicting the RIP time in consideration of a reuse state and a nesting relationship of a reusable component included in page group data. The prediction of the print time and RIP time for a PDF file is also disclosed in Japanese Laid-Open Patent Publication No. 2013-88867.

In recent years, software (hereinafter referred to as "RIP simulation software") for simulating RIP processing has been commercialized. In RIP simulation software, RIP processing is performed on page data in an environment (hereinafter referred to as a "simulation environment") different from an actual environment used when print output is actually executed. There is a correlation between the RIP speed in an actual environment and the RIP speed in a simulation environment, and the predicted RIP time in the actual environment is obtained from the RIP time in the simulation environment on the basis of the correlation. In addition, typical RIP simulation software is provided with a function of predicting an ink consumption amount on the basis of image data obtained by RIP processing in a simulation environment, and a function of analyzing internal data constituting page data in order to present to a user a possibility that a problem occurs in RIP processing in an actual environment.

When simulation is performed with conventional RIP simulation software, for example, a report called an "output prediction report", in which a result regarding RIP processing is written, and a report called a "PDF analysis report", in which an analysis result of a PDF file as page data is written, are created. The output prediction report and the PDF analysis report are prepared in PDF.

FIG. 19 is a diagram illustrating an example of a RIP time prediction graph 910 included in the output prediction report. The horizontal axis represents the sheet number, and the vertical axis represents the RIP time. In the example illustrated in FIG. 19, the predicted RIP times for respective 750 sheets are represented by a line graph denoted by reference numeral 911. The RIP time corresponding to the printing speed at the time of actually executing the print output is represented by a dotted line denoted by reference numeral 912. When all the points on the line graph 911 exist in an area below the dotted line 912, it is understood that the RIP processing will be reliably performed in time for the output operation of the printer. On the other hand, when the point on the line graph 911 exists in an area above the dotted line 912, it is understood that there is a possibility that the RIP processing will not be in time for the output operation of the printer. In a case where there is a high possibility that the RIP processing will not be in time for the output operation of the printer, it is considered to perform the RIP processing before the actual print output (pre-RIP) or to lower the printing speed.

FIG. 20 is a diagram illustrating an example of a page (hereinafter referred to as an "analysis result page") 920 that is a part of the PDF analysis report and describes an analysis result of internal data constituting a PDF file. The analysis result page 920 describes results for items with problems among a plurality of analysis items. For example, a row denoted by reference numeral 921 indicates that a problem has occurred on page 3 regarding an item specified by "analysis number=13". Further, for example, a row denoted by reference numeral 922 indicates that a problem has occurred in a total of 25 pages regarding an item specified by "analysis number=32". It is not possible to specifically understand in which page the problem has occurred from the row denoted by reference numeral 922. Therefore, the PDF analysis report includes a page (hereinafter referred to as a "detailed information page") describing a correspondence relationship between the analysis number and pages in which the problem has occurred. FIG. 21 is a diagram illustrating an example of a detailed information page 930. For example, in a row denoted by reference numeral 931, the numbers of 25 pages in which a problem has occurred regarding the item specified by "analysis number=32" are described. With the PDF analysis report as described above, the user can understand what kind of problem may occur in which page when RIP processing is performed in an actual environment.

PRIOR ART DOCUMENTS

Patent Documents

[Patent Document 1] Japanese Laid-Open Patent Publication No. 2014-67217

[Patent Document 2] Japanese Laid-Open Patent Publication No. 2013-88867

SUMMARY OF THE INVENTION

Problems to be Solved by the Invention

According to the RIP time prediction graph 910 illustrated in FIG. 19, it is understood that there is a problem in the RIP speed of the part denoted by reference numeral 913. In such a case, the user tries to specify a sheet having a problem in the RIP speed from the RIP time prediction graph 910. However, since information on an enormous number of sheets is described in the RIP time prediction graph 910, it is difficult to specify an accurate number (sheet number) of the sheet having a problem. In the example illustrated in FIG. 19, it is merely understood that the number of the sheet having a problem is a number near 450. Then, the user refers to the analysis result page 920 (cf. FIG. 20) and the detailed information page 930 (cf. FIG. 21) on the basis of the sheet number (incorrect sheet number) specified as described above and a preset "correspondence relationship between sheets and pages", thereby specifying a problem adversely affecting the RIP speed. However, since the number of sheets is enormous and it is difficult to specify an accurate sheet number, it is not possible to rapidly grasp a part (sheet, page) having a problem and a specific detail of the problem.

Therefore, an object of the present invention is to achieve a RIP simulation device (a computer into which RIP simulation software is introduced) that enables a rapid grasp of a part having a problem in RIP speed and a specific detail of the problem.

Means for Solving the Problems

A first aspect of the present invention is directed to a RIP simulation device that simulates RIP processing on page data including a plurality of pages in consideration of a correspondence relationship between sheets and pages when print output is actually executed, the RIP simulation device including:
  a display unit;
  an input operation unit for performing an operation on a screen displayed on the display unit;
  a page data designation unit for designating page data to be simulated;
  a page data analysis unit configured to analyze internal data constituting target data that is the page data designated by the page data designation unit, for a plurality of items related to RIP processing;
  a RIP speed prediction unit configured to predict a RIP time for each sheet and a RIP speed when RIP processing is performed on the target data in an actual environment used when print output is actually executed, by performing RIP processing on the target data in an environment different from the actual environment; and
  a result display control unit configured to display a RIP prediction screen representing predicted RIP times for respective sheets or predicted RIP speeds for respective sheets on the display unit,
  wherein in a state in which the RIP prediction screen is displayed on the display unit, the result display control unit causes the display unit to display an analysis result screen showing an analysis result related to a page corresponding to a sheet number specified by a predetermined operation among analysis results obtained by analysis by the page data analysis unit, on a basis of a correspondence relationship between sheets and pages when print output is actually executed.

According to a second aspect of the present invention, in the first aspect of the present invention,
  predicted RIP times for respective sheets or predicted RIP speeds for respective sheets is displayed in a predicted RIP graph on the RIP prediction screen.

According to a third aspect of the present invention, in the second aspect of the present invention,
  in a state in which the RIP prediction screen is displayed on the display unit, the result display control unit causes the display unit to display a sheet number that corresponds to a position being on the predicted RIP graph and designated by the input operation unit.

According to a fourth aspect of the present invention, in the third aspect of the present invention,
  a sheet number displayed on the display unit can be selected by the input operation unit, and
  the predetermined operation is an operation of selecting a sheet number displayed on the display unit by the input operation unit.

According to a fifth aspect of the present invention, in the second aspect of the present invention,
  the RIP prediction screen displays, in addition to the predicted RIP graph, a sheet processing time graph representing a line at which RIP processing is in time for a printing speed when printing output is actually executed.

According to a sixth aspect of the present invention, in the first aspect of the present invention,
  the analysis result screen shows an analysis result for each of the items.

According to a seventh aspect of the present invention, in the sixth aspect of the present invention,
  the analysis result screen shows analysis results arranged in order of importance of the items.

According to an eighth aspect of the present invention, in the sixth aspect of the present invention,
  in a state in which the analysis result screen is displayed on the display unit, an analysis result for each of the items can be selected by the input operation unit, and
  when an analysis result for any item is selected by the input operation unit, the result display control unit causes the display unit to display an image confirmation screen representing an image of a page associated with the selected analysis result.

According to a ninth aspect of the present invention, in the eighth aspect of the present invention,
  the RIP simulation device further includes a page data correction unit configured to correct internal data corresponding to an image part selected by the input operation unit in a state in which the image confirmation screen is displayed on the display unit, and
  when the page data correction unit corrects the internal data, the result display control unit causes the display unit to display a RIP prediction screen based on target data before correction of the internal data and a RIP prediction screen based on target data after the correction of the internal data side by side.

According to a tenth aspect of the present invention, in the first aspect of the present invention,
  the RIP prediction screen is displayed on the display unit by using a web user interface.

A twelfth aspect of the present invention is directed to a non-transitory computer-readable recording medium recording a RIP simulation program that simulates RIP processing on page data including a plurality of pages in consideration of a correspondence relationship between sheets and pages when print output is actually executed, the RIP simulation program causing a computer, including a display unit and an input operation unit for performing an operation on a screen displayed on the display unit, to function as a page data designation unit for designating page data to be simulated;

a page data analysis unit configured to analyze internal data constituting target data that is the page data designated by the page data designation unit, for a plurality of items related to RIP processing;

a RIP speed prediction unit configured to predict a RIP time for each sheet and a RIP speed when RIP processing is performed on the target data in an actual environment used when print output is actually executed, by performing RIP processing on the target data in an environment different from the actual environment; and a result display control unit configured to display a RIP prediction screen representing predicted RIP times for respective sheets or predicted RIP speeds for respective sheets on the display unit, wherein in a state in which the RIP prediction screen is displayed on the display unit, the result display control unit causes the display unit to display an analysis result screen showing an analysis result related to a page corresponding to a sheet number specified by a predetermined operation among analysis results obtained by analysis by the page data analysis unit, on a basis of a correspondence relationship between sheets and pages when print output is actually executed.

Effects of the Invention

According to the first aspect of the present invention, when a predetermined operation is performed in a state in which a RIP prediction screen representing predicted RIP times for respective sheets is displayed, a sheet number is specified. That is, a sheet number of a part having a problem in the RIP speed can be specified by the predetermined operation. Further, an analysis result (an analysis result of internal data constituting page data) related to the page corresponding to the specified sheet number is displayed on the display unit. It is thereby possible to rapidly grasp the specific detail of the problem regarding the RIP processing. From the above, a RIP simulation device that enables a rapid grasp of a part having a problem in RIP speed and a specific detail of the problem is achieved.

According to the second aspect of the present invention, it is possible to easily understand in which part of all the sheets a problem may occur in the RIP speed when the RIP processing is performed on the target data.

According to the third aspect of the present invention, it is possible to rapidly specify a sheet having a problem in RIP speed.

According to the fourth aspect of the present invention, the same effect as that of the third aspect of the present invention can be obtained.

According to the fifth aspect of the present invention, it is possible to easily understand whether there is a possibility that the RIP processing will not be in time for the output operation of the printer.

According to the sixth aspect of the present invention, it is possible to promptly grasp an analysis result related to a page corresponding to a sheet number specified by a predetermined operation.

According to the seventh aspect of the present invention, when there is a plurality of problems in the target data, the importance of each problem can be grasped promptly.

According to the eighth aspect of the present invention, in a case where there is a problem in the target data, it is possible to confirm a part having the problem by viewing the image.

According to the ninth aspect of the present invention, in a case where there is a problem in the target data, the target data can be easily corrected so that the problem is solved. In addition, it is possible to easily understand whether or not appropriate correction has been performed.

According to the tenth aspect of the present invention, it is possible to enlarge and display a RIP prediction screen without causing crushing or blurring of characters or lines.

According to the twelfth aspect of the present invention, the same effect as that of the first aspect of the present invention can be obtained.

BRIEF DESCRIPTION OF THE DRAWINGS

FIG. 1 is an overall configuration diagram of a printing system according to an embodiment of the present invention.

FIG. 2 is a hardware configuration diagram of a control server (RIP simulation device) in the embodiment.

FIG. 3 is a block diagram illustrating a functional configuration of a control server functioning as a RIP simulation device in the embodiment.

FIG. 6 is a view illustrating an example of a job list screen in the embodiment.

FIG. 7 is a diagram illustrating an example of an output prediction report in the embodiment.

FIG. 12 is a view illustrating an example of an analysis result screen in the embodiment.

FIG. 16 is a flowchart illustrating an example of a detailed procedure for data correction in the embodiment.

FIG. 17 is a view illustrating an example of a correction confirmation screen in the embodiment.

FIG. 20 is a diagram illustrating an example of an analysis result page according to the conventional example.

FIG. 21 is a diagram illustrating an example of a detailed information page according to the conventional example.

MODE FOR CARRYING OUT THE INVENTION

Figure 4:
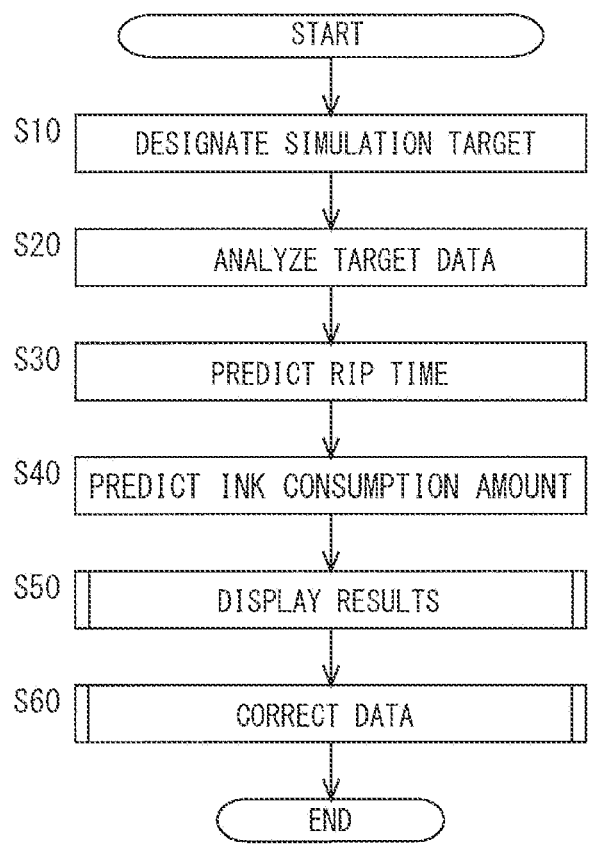
FIG. 4 is a flowchart illustrating an example of a schematic procedure when simulation of RIP processing is performed on one PDF file (submitted data) in the embodiment.

An embodiment of the present invention will be described below with reference to the accompanying drawings.

1. OVERALL CONFIGURATION OF PRINTING SYSTEM

FIG. 1 is an overall configuration diagram of a printing system according to an embodiment of the present invention. The printing system includes an inkjet printing apparatus 100, a control server 200, and an execution server 300. The inkjet printing apparatus 100, the control server 200, and the execution server 300 are communicably connected to each other by a communication line 400. The inkjet printing apparatus 100 performs printing on the basis of print data that is digital data without using a printing plate. Note that the inkjet printing apparatus 100 includes a printer body and a controller that controls the printer body. The control server 200 controls the entire printing process in the printing system. RIP simulation software (RIP simulation program) is introduced into the control server 200, and the control server 200 also functions as a RIP simulation device. That is, in the simulation stage before the print output is actually executed, the RIP processing is performed by the control server 200. The execution server 300 performs RIP processing on page data to be printed when print output by the inkjet printing apparatus 100 is actually executed.

As for the printer body of the inkjet printing apparatus 100, a printer body for printing the front-side of a sheet and a printer body for printing the back-side of a sheet may be provided. In this case, each of the control server 200 and the execution server 300 may also be divided into a front-side server and a back-side server. In addition, the control for the execution of simulation of the RIP processing may be given to the control server 200 from a client's personal computer connected to the communication line 400.

2. HARDWARE CONFIGURATION OF CONTROL SERVER

FIG. 2 is a hardware configuration diagram of the control server 200 according to the present embodiment. The control server 200 is implemented by a personal computer and includes a central processing unit (CPU) 21, a read-only memory (ROM) 22, a random-access memory (RAM) 23, an auxiliary storage device 24, an input operation unit 25, a display unit 26, an optical disk drive 27, and a network interface unit 28. The auxiliary storage device 24 stores a RIP simulation program 241 for executing the simulation of the RIP processing. The auxiliary storage device 24 also stores submitted data transmitted via the communication line 400, result data of simulation of the RIP processing, and the like.

As described above, the RIP simulation program 241 is stored in the auxiliary storage device 24. When the execution of simulation of the RIP processing is instructed in the control server 200, the RIP simulation program 241 is read into the RAM 23, and the CPU 21 executes the RIP simulation program 241 read into the RAM 23. In this manner, the control server 200 functions as a RIP simulation device. That is, the simulation of the RIP processing is executed in the control server 200. The RIP simulation program 241 is provided by being stored in a computer-readable recording medium (non-transitory recording medium) such as a CD-ROM or a DVD-ROM. That is, for example, the user purchases an optical disk (CD-ROM, DVD-ROM, etc.) 270 as a recording medium of the RIP simulation program 241, attaches the optical disk to the optical disk drive 27, reads the RIP simulation program 241 from the optical disk 270, and installs the RIP simulation program 241 in the auxiliary storage device 24. Alternatively, the RIP simulation program 241 transmitted via the communication line 400 may be received by the network interface unit 28 and installed in the auxiliary storage device 24.

3. FUNCTIONAL CONFIGURATION

FIG. 3 is a block diagram illustrating the functional configuration of the control server 200 functioning as the RIP simulation device. The control server 200 functionally includes a page data storage unit 51, a page data designation unit 52, a PDF analysis unit 53, a RIP speed prediction unit 54, an ink consumption amount prediction unit 55, a result display control unit 56, a page data correction unit 57, an input operation unit 25, and a display unit 26. Note that the page data storage unit 51 is achieved by the auxiliary storage device 24 as hardware.

The page data storage unit 51 holds submitted data that is page data including a plurality of pages. In the present embodiment, it is assumed that the submitted data is a PDF file. Hence a PDF file is held in the page data storage unit 51. Note that the page data storage unit 51 may be provided in a device different from the control server 200.

The page data designation unit 52 designates a PDF file to be simulated out of PDF files held in the page data storage unit 51. In this regard, a job template is created for each printing condition prior to the simulation of the RIP processing in the control server 200, and the designation of the PDF file by the page data designation unit 52 is performed specifically by registering the target PDF file in a job template that corresponds to a printing condition to be simulated. Note that the printing condition is a combination of the model of the inkjet printing apparatus 100, printing speed, resolution, and the like.

The PDF analysis unit 53 analyzes internal data constituting the PDF file designated by the page data designation unit 52 (the designated PDF file is hereinafter referred to as "target data"). Note that a page data analysis unit is achieved by the PDF analysis unit 53. The analysis of the internal data by the PDF analysis unit 53 is performed for a plurality of items (analysis items) related to the RIP processing. Examples of the analysis items include, for example, the following items.

Example 1: Whether an image with a predetermined resolution or higher has been used.

Example 2: Whether the data size of an image is incorrect.

Example 3: Whether there is a non-embedded font.

The RIP speed prediction unit 54 predicts the RIP time for each sheet and the RIP speed when the RIP processing is performed on the target data in an actual environment used when the print output is actually executed, by performing RIP processing on the target data in an environment different from the actual environment. In the present embodiment, specifically, the RIP speed prediction unit 54 performs the RIP processing on the target data by the control server 200, whereby predicting the RIP time for each sheet and the RIP speed when the RIP processing is performed on the target data by the execution server 300. Note that a correspondence relationship between sheets and pages when print output is actually executed is set in advance (i.e., a setting of imposition is performed in advance), and the RIP processing by the RIP speed prediction unit 54 is performed in consideration of the correspondence relationship.

The ink consumption amount prediction unit 55 predicts an ink consumption amount for each ink type (color) using the image data obtained by the RIP processing by the RIP speed prediction unit 54 in consideration of the printing condition. Note that the ink consumption amount prediction unit 55 is a component not directly related to the present invention.

The result display control unit 56 controls the screen display of the result of the simulation on the display unit 26 on the basis of an operation by the user using the input operation unit 25. In the present embodiment, the screen display on the display unit 26 is performed using a web user interface.

The page data correction unit 57 corrects internal data corresponding to an image part selected by the input operation unit 25 in a state in which an image confirmation screen to be described later is displayed on the display unit 26.

Meanwhile, the input operation unit 25 is a component for performing an operation on a screen displayed on the display unit 26. In this regard, for example, a mouse or a keyboard functions as the input operation unit 25, but the keyboard is not directly related to the present invention. Therefore, in the following description, the mouse is focused on as the input operation unit 25, and the mouse is also denoted by the same reference numeral 25 as the input operation unit.

4. SCHEMATIC PROCEDURE

FIG. 4 is a flowchart illustrating an example of a schematic procedure when the simulation of the RIP processing is performed on one PDF file (submitted data). First, a PDF file to be simulated is designated (step S10). The PDF file is designated, for example, by registering the target PDF file in the job template that corresponds to the printing condition desired to be simulated, as described above. Note that one job is obtained by associating one PDF file with one job template.

Next, the PDF analysis unit 53 analyzes the internal data constituting the target data (PDF file designated in step S10) (step S20). Next, by the RIP speed prediction unit 54, RIP processing is performed on the target data in the control server 200 and the RIP time for each sheet and the RIP speed and are predicted on the basis of the result (step S30). Next, the ink consumption amount prediction unit 55 predicts the ink consumption amount for each ink type (color) (step S40).

Thereafter, the screen display of the results obtained in the processing of steps S20 to S40 on the display unit 26 is performed (step S50). Then, data correction (correction of internal data corresponding to the image part selected by the user with the mouse 25 in a state in which an image of a page having a problem is displayed) is performed by the page data correction unit 57 (step S60). Note that details of steps S50 and S60 will be described later.

5. DETAILS OF RESULT DISPLAY

Figure 5:
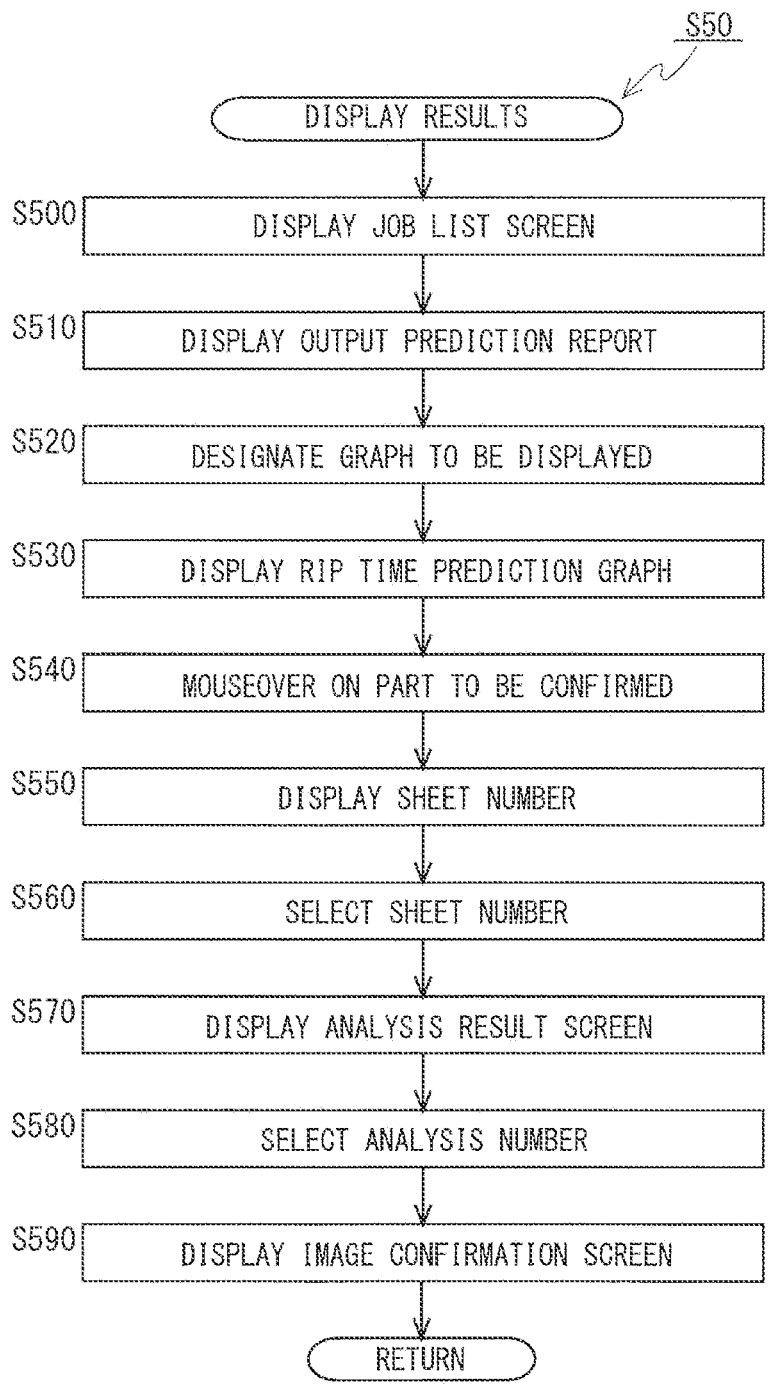
FIG. 5 is a flowchart illustrating an example of a detailed procedure regarding display of a simulation result in the embodiment.

Next, the display of the simulation result on the display unit 26 will be described in detail. FIG. 5 is a flowchart illustrating an example of a detailed procedure regarding display of a simulation result.

After the completion of the processing in steps S20 to S40 described above, first, a job list screen displaying a list of jobs for which simulation has been executed so far is displayed on the display unit 26 (step S500). FIG. 6 is a view illustrating an example of the job list screen 600. Regarding the job list screen 600, a result of analysis of internal data by the PDF analysis unit 53 is briefly described in a column of "Analysis result", and a result of RIP processing by the RIP speed prediction unit 54 is briefly described in a column of "Simulation result". In addition, two buttons 601,602 are provided in a column of "Function" for each job. These two buttons 601,602 can be selected (clicked) with the mouse 25. When the button 601 is selected with the mouse 25, an output prediction report is displayed, and when the button 602 is selected with the mouse 25, a PDF analysis report is displayed. However, unlike the conventional case, the output prediction report and the PDF analysis report are displayed using a web user interface.

By the selection of the button 601 in the job list screen 600 with the mouse, the output prediction report is displayed on the display unit 26 (step S510). FIG. 7 is a diagram illustrating an example of the output prediction report 620. The output prediction report 620 includes a basic information display field 625, a RIP speed prediction display field 626, an ink consumption amount prediction display field 627, and a printer information display field 628. Basic information on the target job is displayed in the basic information display field 625. In the RIP speed prediction display field 626, a predicted value of the RIP speed when the RIP processing is performed in the actual environment (execution server 300) and the like (predicted speed and the like) are displayed on the basis of the result of the processing by the RIP speed prediction unit 54. In the ink consumption amount prediction display field 627, a predicted value of the ink consumption amount for each ink type (color) is displayed on the basis of the result of the processing by the ink consumption amount prediction unit 55. In the printer information display field 628, information on a printer that corresponds to the target job is displayed.

Regarding the output prediction report 620, areas 621 to 624 can be selected (clicked) with the mouse 25. When the area 621 is selected, all of the basic information display field 625, the RIP speed prediction display field 626, the ink consumption amount prediction display field 627, and the printer information display field 628 are displayed. When the area 622 is selected, only the RIP speed prediction display field 626 is displayed as illustrated in FIG. 7. When the area 623 is selected, only the ink consumption amount prediction display field 627 is displayed. When the area 624 is selected, only the printer information display field 628 is displayed. Note that the basic information display field 625 may also be displayed when each of the areas 622 to 624 is selected.

As illustrated in FIG. 7, the RIP speed prediction display field 626 of the output prediction report 620 is provided with two buttons 71, 72 for displaying a RIP time prediction graph (simulation graph). The two buttons 71, 72 can be selected (clicked) with the mouse 25. When the button 71 is selected with the mouse 25, a RIP time prediction graph for the front side of the sheet is displayed. When the button 72 is selected with the mouse 25, a RIP time prediction graph for the back side of the sheet is displayed.

In a state in which the output prediction report 620 is displayed on the display unit 26, the user designates a graph to be displayed with the mouse 25 (step S520). That is, the user selects the button 71 when the RIP time prediction graph for the front side of the sheet is desired to be displayed, and the user selects the button 72 when the RIP time prediction graph for the back side of the sheet is desired to be displayed.

Figure 8:
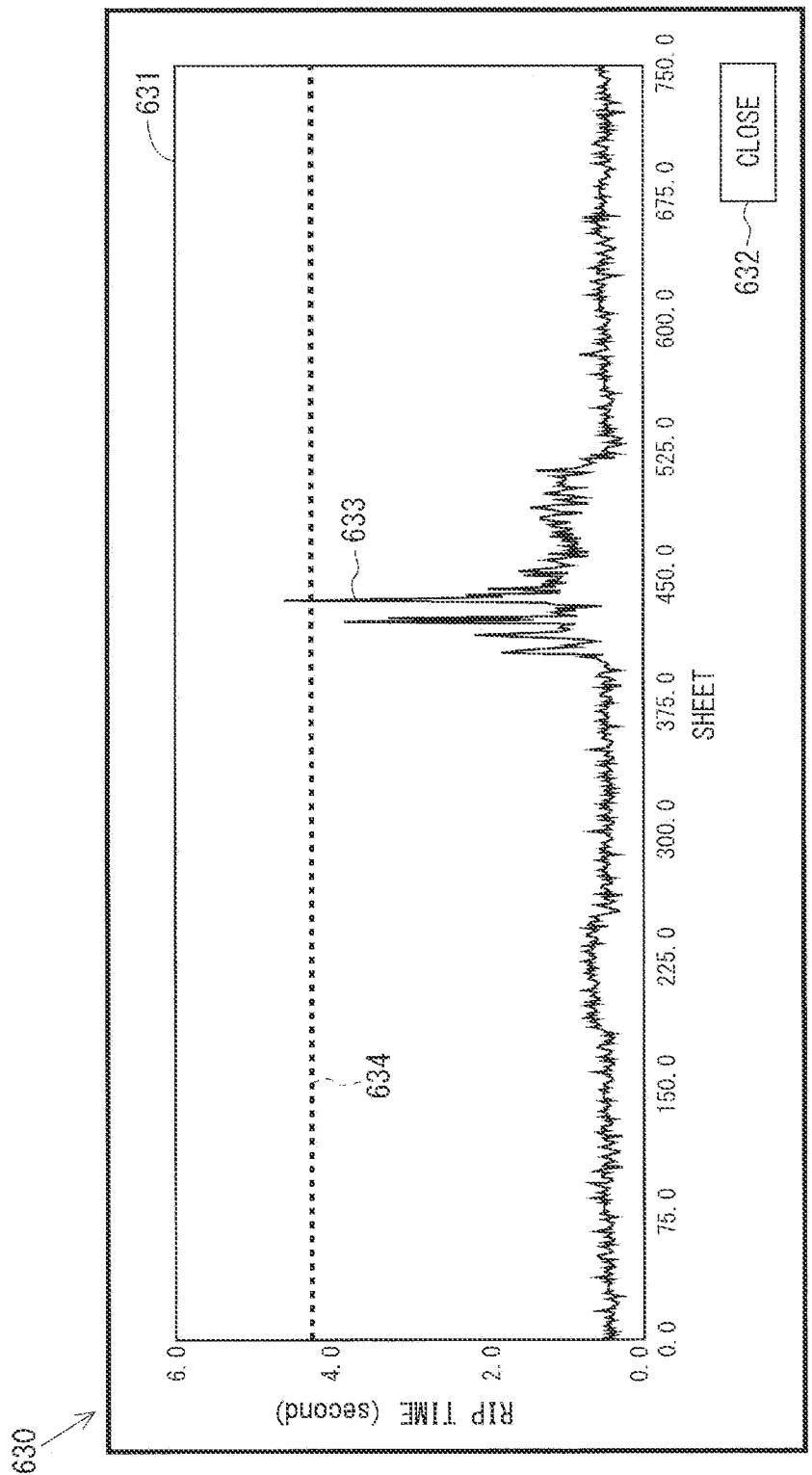
FIG. 8 is a view illustrating an example of a RIP prediction screen in the embodiment.

Next, a RIP prediction screen including a RIP time prediction graph corresponding to the button selected in step S520 is displayed on the display unit 26 (step S530). FIG. 8 is a view illustrating an example of the RIP prediction screen 630 displayed on the display unit 26. As illustrated in FIG. 8, the RIP prediction screen 630 includes a RIP time prediction graph 631 with a horizontal axis representing a sheet number and a vertical axis representing RIP time, and a close button 632. The close button 632 can be selected (clicked) with the mouse 25, and when the close button 632 is selected, the RIP prediction screen 630 is hidden. Although the predicted RIP times for respective sheets are displayed as a line graph in the present embodiment, the present invention is not limited thereto, and the predicted RIP times for respective sheets may be displayed in a tabular form, for example.

Figure 9:
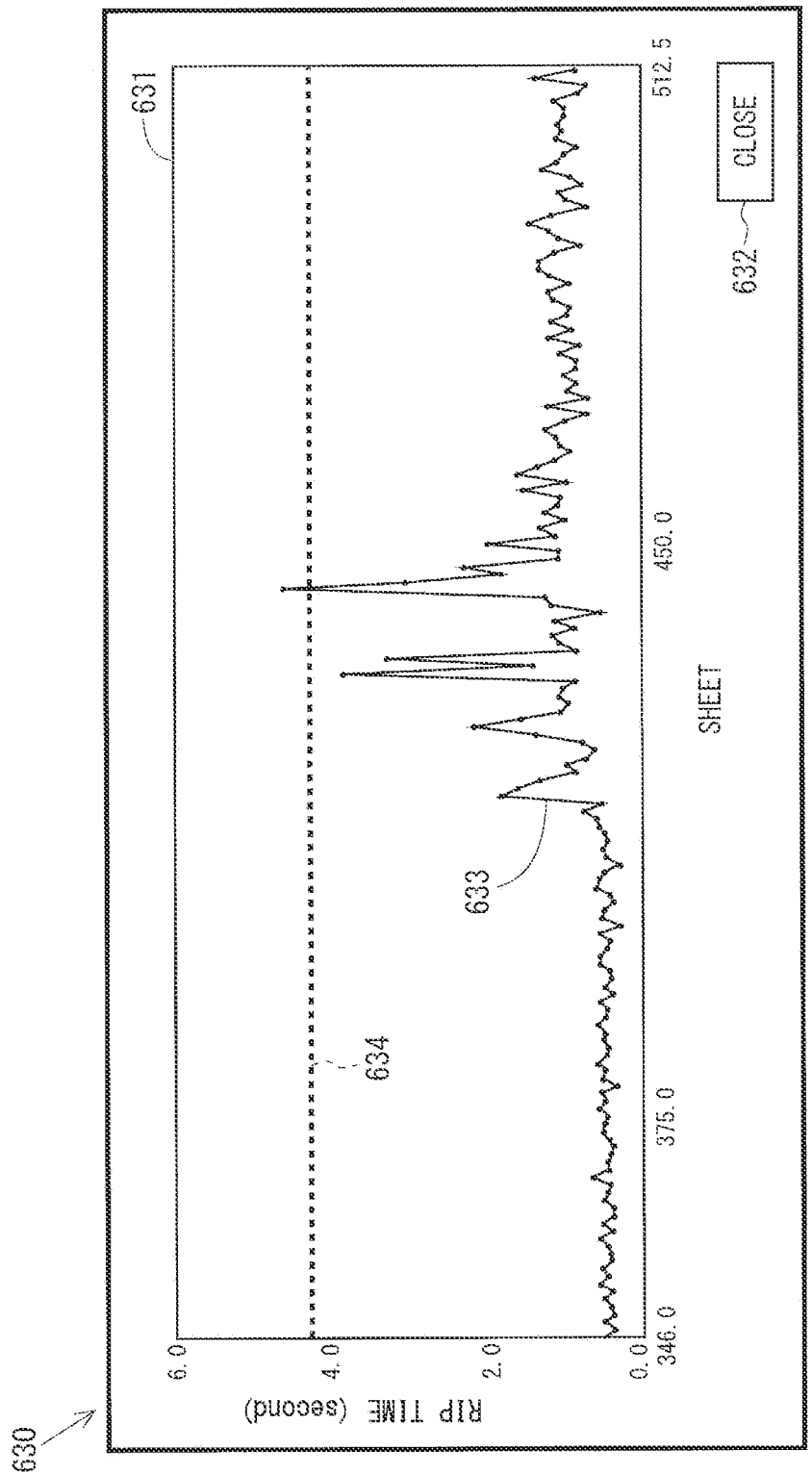
FIG. 9 is a view illustrating an example of a RIP prediction screen including a RIP time prediction graph after enlarged display in the embodiment.

Focusing on the RIP time prediction graph 631 illustrated in FIG. 8, predicted values of the RIP time for respective 750 sheets (predicted RIP times) are represented by a line graph denoted by reference numeral 633. In addition, the RIP time corresponding to the printing speed at the time of actually executing the print output is represented by a dotted line denoted by reference numeral 634. Since the dotted line 634 indicating the RIP time corresponding to the printing speed is displayed together with the line graph 633, it is possible to easily understand whether there is a possibility that the RIP processing will not be in time for the output operation of the inkjet printing apparatus 100. Meanwhile, in the present embodiment, the RIP time prediction graph 631 can be enlarged and displayed. Specifically, the enlarged display is performed by dragging a range to be enlarged with the mouse 25. FIG. 9 is a view illustrating an example of the RIP prediction screen 630 including the RIP time prediction graph 631 after enlarged display. In the example illustrated in FIG. 9, the enlarged display is performed such that the range from 346 to 512 regarding the sheet number is included in the RIP prediction screen 630. Note that the line graph 633 corresponds to a predicted RIP graph, and the dotted line 634 corresponds to a sheet processing time graph.

Figure 10:
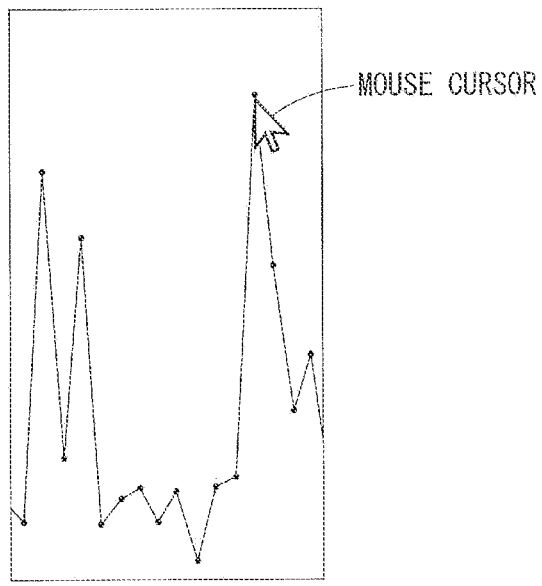
FIG. 10 is a diagram for describing a mouseover operation for a point part on a line graph in the embodiment.
Figure 11:
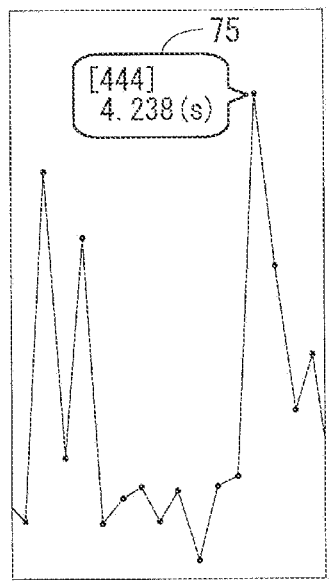
FIG. 11 is a diagram for describing display of a sheet number in the embodiment.

In the present embodiment, when a mouseover operation is performed on the part of a point (a point representing the predicted RIP time that corresponds to each sheet number) on the line graph 633, the sheet number that corresponds to the target point (position) is displayed. Therefore, as illustrated in FIG. 10, the user performs a mouseover operation on the part of a point where the sheet number is desired to be confirmed (step S540). Then, for example, as illustrated in FIG. 11, a balloon mark 75 including the sheet number corresponding to the point at which the mouseover operation has been performed and the predicted RIP time is displayed (step S550). In the example illustrated in FIG. 11, it is understood that the sheet number that corresponds to the target point (position) is "444", and the predicted RIP time for this sheet is "4.238 seconds". As above, in a state in which the RIP prediction screen 630 is displayed on the display unit 26, the result display control unit 56 causes the display unit 26 to display the sheet number that corresponds to the position being on the line graph 633 and designated with the mouse 25. Although the sheet number is displayed by the mouseover operation on the part of the point on the line graph 633 in the present embodiment, the present invention is not limited thereto, and for example, the sheet number may be displayed by clicking the part of the point on the line graph 633.

Figure 13:
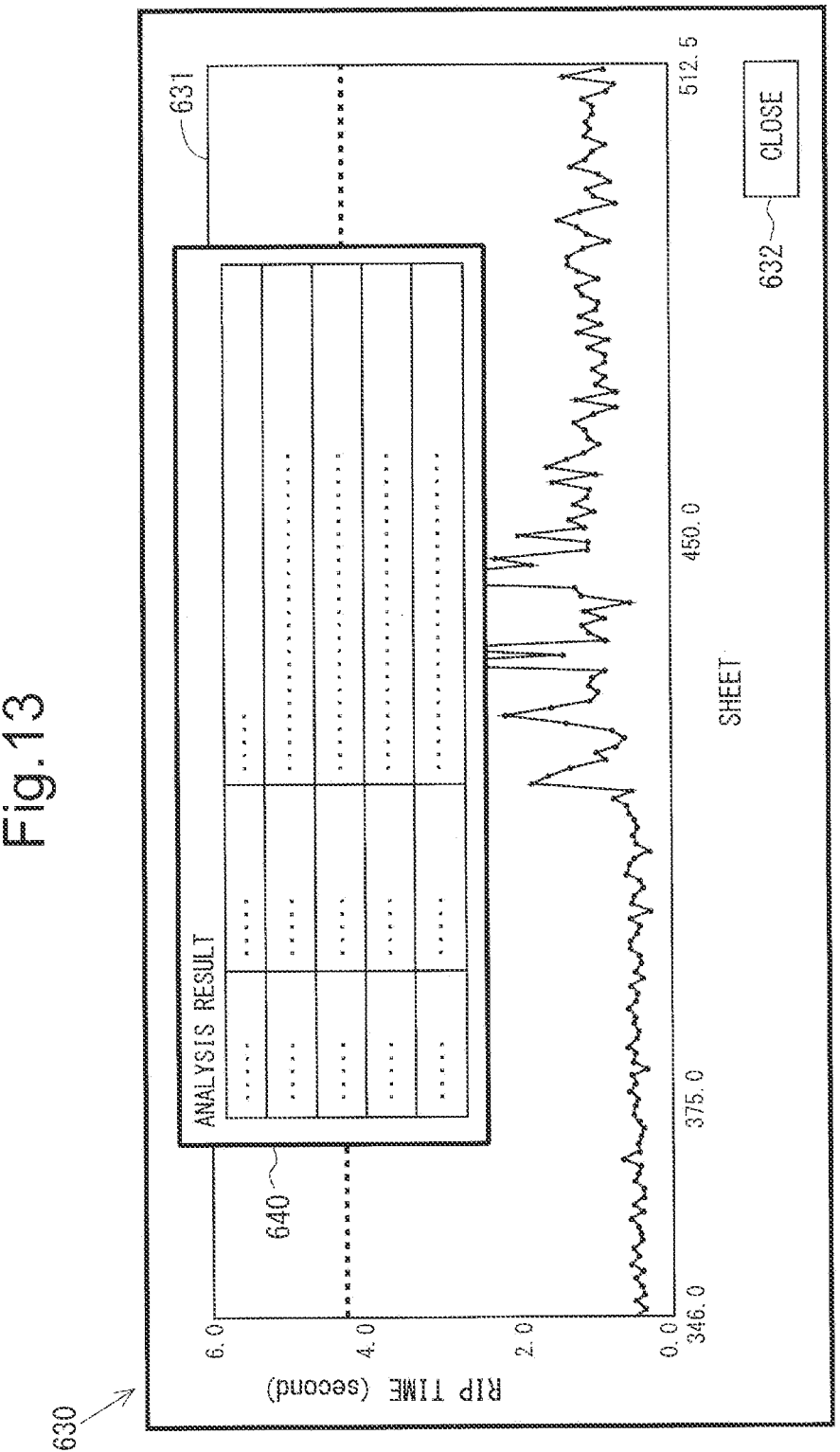
FIG. 13 is a view for describing display of the analysis result screen in the embodiment.

The sheet number displayed by the mouseover operation can be selected (clicked) with the mouse 25. In the present embodiment, when a sheet number is selected with the mouse 25, an analysis result screen showing an analysis result (an analysis result of internal data by the PDF analysis unit 53) related to a page corresponding to the selected sheet number is displayed on the basis of a correspondence relationship between sheets and pages when print output is actually executed. Therefore, the user selects the sheet number corresponding to the point to be confirmed with the mouse 25 in a state in which the sheet number is displayed as illustrated in FIG. 11 (step S560). Thereby, for example, as illustrated in FIG. 12, the analysis result screen 640 is displayed (step S570). More specifically, a screen as illustrated in FIG. 13 in which the analysis result screen 640 is superimposed on the RIP prediction screen 630 is displayed on the display unit 26.

FIG. 12 is a view illustrating an example of the analysis result screen 640. As illustrated in FIG. 12, on the analysis result screen 640, results (analysis results) for items having problems with respect to a page included in the target sheet number among a plurality of analysis items are displayed in order of importance. With the analysis result screen 640, the user can understand what kind of problem may occur in the page included in the target sheet number when the RIP processing is performed in the actual environment.

Figure 14:
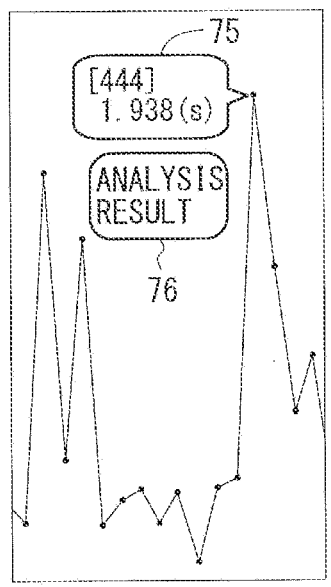
FIG. 14 is a view for describing another example of a configuration for displaying the analysis result screen in the embodiment.

Although the analysis result screen 640 is displayed by selecting the sheet number with the mouse 25 on the screen as illustrated in FIG. 11 in the present embodiment, the present invention is not limited thereto. For example, the configuration may be such that an analysis result button 76 is displayed in the vicinity of the balloon mark 75 including the sheet number and the predicted RIP time as illustrated in FIG. 14 and the analysis result screen 640 is displayed when the analysis result button 76 is selected with the mouse 25.

Figure 15:
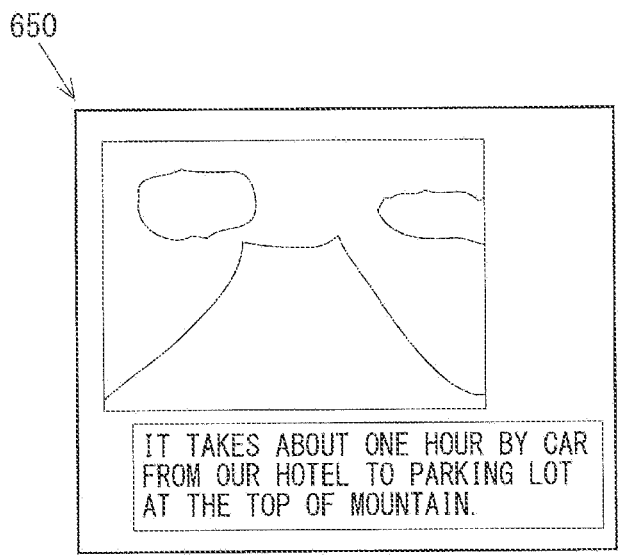
FIG. 15 is a view illustrating an example of an image confirmation screen in the embodiment.

Meanwhile, in the present embodiment, in a state in which the analysis result screen 640 is displayed, the analysis number of each row indicating the analysis result can be selected (clicked) with the mouse 25. For example, focusing on a row denoted by reference numeral 641 in FIG. 12, the part of "10" representing an analysis number can be selected. When the analysis number is selected with the mouse 25, an image confirmation screen representing an image of a page associated with the analysis number is displayed on the display unit 26. Therefore, the user selects the analysis number, with the mouse 25, corresponding to the analysis item for which the specific detail of the problem is desired to be confirmed by viewing the image (step S580). As a result, for example, as illustrated in FIG. 15, an image confirmation screen 650 including a target image is displayed on the display unit 26 (step S590). From the above, in a state in which there is a problem in the page data, it is possible to confirm a part having the problem by viewing the image. After the image confirmation screen 650 is displayed, the processing proceeds to step S60 in FIG. 4.

Regarding the analysis result screen 640, although the analysis number can be selected with the mouse 25 in the present embodiment, the present invention is not limited thereto. For each row indicating the analysis result, the part of the importance may be selectable, or the part of the problem may be selectable. In addition, the entire row indicating the analysis result may be selectable. As described above, when the analysis result for any item is selected with the mouse 25, the result display control unit 56 causes the display unit 26 to display the image confirmation screen 650 representing the image of the page associated with the selected analysis result.

6. DETAILS OF DATA CORRECTION

Next, data correction by the page data correction unit 57 will be described in detail. In the present embodiment, a correction menu is provided to instruct the correction of the internal data constituting the target data (a PDF file designated in step S10 of FIG. 4). The correction menu can be selected when the image confirmation screen 650 described above is displayed on the display unit 26. When the correction menu is selected, a correction target can be selected on the image confirmation screen 650. Based on the above, a detailed procedure of data correction will be described with reference to FIG. 16.

First, the user selects the correction menu in a state in which the image confirmation screen 650 (cf. FIG. 15) is displayed on the display unit 26 (step S600). Next, the user selects (clicks) a correction target such as an image or text by using the mouse 25 on the image confirmation screen 650 (step S610). Thereby, a correction confirmation screen for confirming whether or not to actually correct the internal data is displayed on the display unit 26. FIG. 17 is a view illustrating an example of a correction confirmation screen 660. As illustrated in FIG. 17, the correction confirmation screen 660 includes a correction execution button 661 and a cancel button 662. When the cancel button 662 is selected, the internal data is not corrected.

When the user desires to correct the internal data, the user selects the correction execution button 661 with the mouse 25 on the correction confirmation screen 660 (step S630). As a result, the internal data of the target data (PDF file) is actually corrected on the basis of the selection of the correction target with the mouse 25 in step S610 (step S640). Thereafter, the simulation of the RIP processing is executed again for the target data after the correction of the internal data (step S650).

Figure 18:
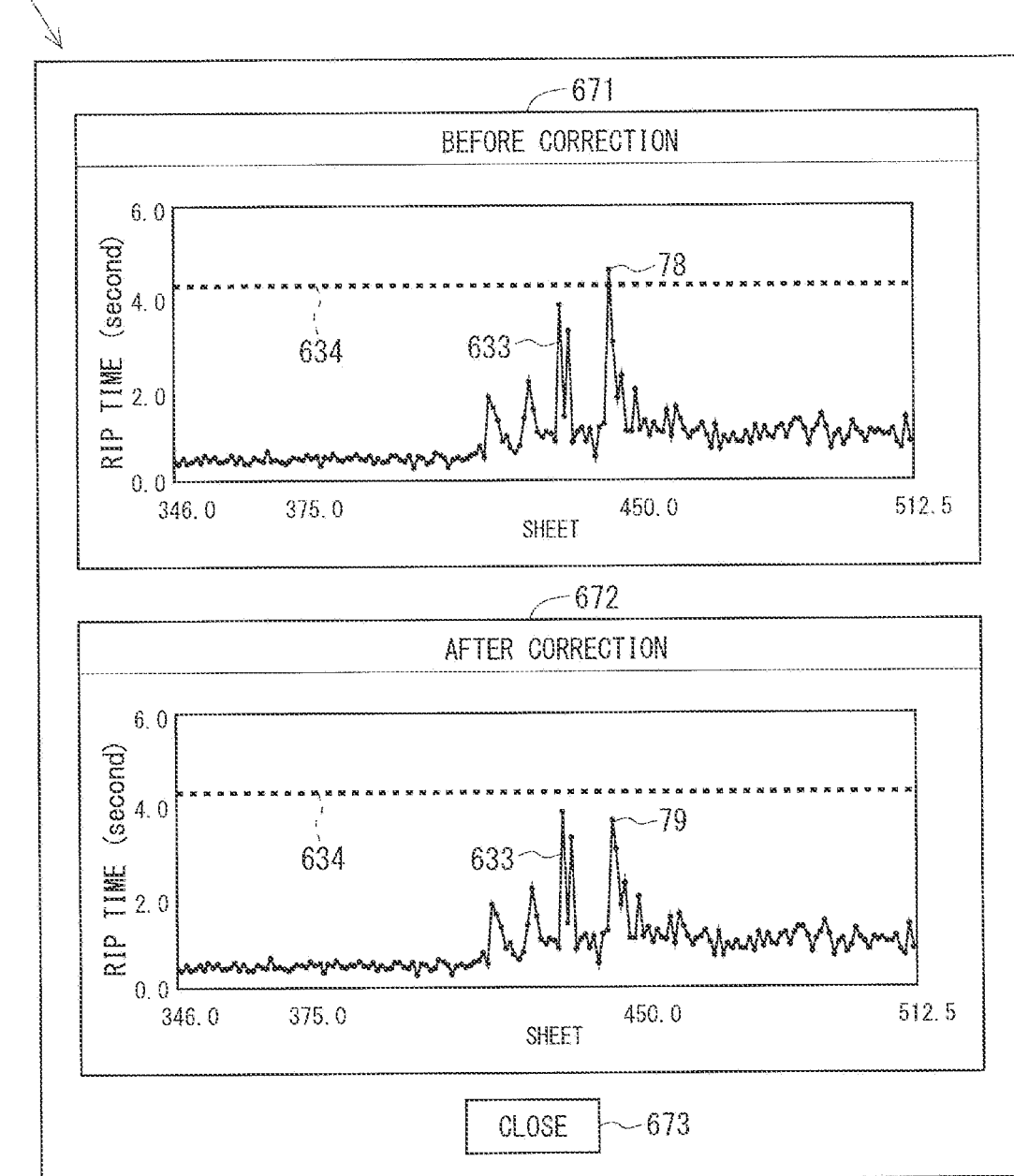
FIG. 18 is a view illustrating an example of a screen displayed on a display unit after correction of internal data in the embodiment.
Figure 19:
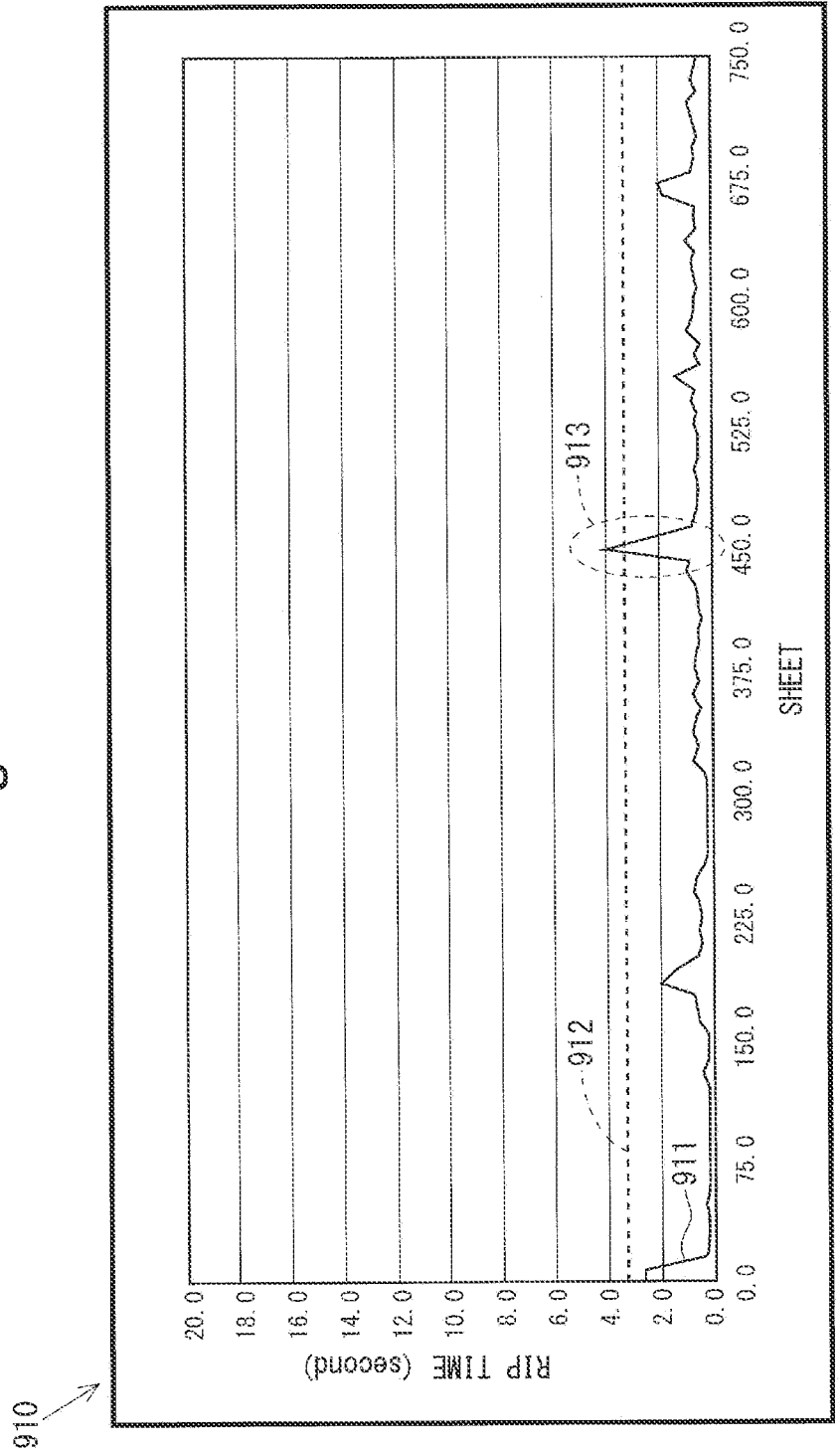
FIG. 19 is a diagram illustrating an example of a RIP time prediction graph included in an output prediction report according to the conventional example.

After the end of the simulation, the RIP time prediction graphs before and after the correction of the internal data for the target data are displayed (step S660). Specifically, for example, as illustrated in FIG. 18, a comparison screen 670 including a RIP time prediction graph 671 before the correction of the internal data for the target data, a RIP time prediction graph 672 after the correction of the internal data for the target data, and a close button 673 is displayed on the display unit 26. The close button 673 can be selected (clicked) with the mouse 25, and when the close button 673 is selected, the comparison screen 670 is hidden. As above, when the page data correction unit 57 corrects the internal data, the result display control unit 56 causes the display unit 26 to display the RIP prediction screen (RIP time prediction graph 671) based on the target data before the correction of the internal data and the RIP prediction screen (RIP time prediction graph 672) based on the target data after the correction of the internal data side by side. Since the RIP time prediction graphs before and after the correction of the internal data are displayed as described above, it is possible to easily understand whether or not appropriate correction has been performed.

Meanwhile, in the example illustrated in FIG. 18, a point 78 located in the area above the dotted line 634 before the correction is located in the area below the dotted line 634 after the correction (cf. the point denoted by reference numeral 79). It is thereby understood that the RIP processing is reliably in time for the output operation of the printer due to the correction of the internal data.

7. EFFECTS

According to the present embodiment, in a state where the RIP prediction screen 630 representing the predicted RIP times for respective sheets is displayed on the display unit 26, when the mouseover operation is performed on any point on the line graph 633, the sheet number corresponding to the point is displayed on the display unit 26. This makes it possible to rapidly grasp a part (sheet) having a problem in the RIP speed. In addition, when the sheet number displayed on the display unit 26 is selected (clicked), the analysis result (the analysis result of the internal data constituting the PDF file) related to the page corresponding to the sheet number is displayed on the display unit 26. This makes it possible to rapidly grasp the specific detail of the problem regarding the RIP processing. From the above, according to the present embodiment, a RIP simulation device that enables a rapid grasp of a part having a problem in RIP speed and a specific detail of the problem is achieved.

8. OTHERS

The present invention is not limited to the above embodiment, and a variety of modifications may be made so long as not deviating from the scope of the present invention. For example, although an example in which a mouse is used as the input operation unit has been described in the above embodiment, the present invention is not limited thereto, and a touch pen can also be used as the input operation unit. Further, although the predicted RIP times for respective sheets have been displayed on the RIP prediction screen 630 in the above embodiment, the predicted RIP speeds for respective sheets may be displayed on the RIP prediction screen 630.

DESCRIPTION OF REFERENCE CHARACTERS

25: INPUT OPERATION UNIT
26: DISPLAY UNIT
51: PAGE DATA STORAGE UNIT
52: PAGE DATA DESIGNATION UNIT
53: PDF ANALYSIS UNIT
54: RIP SPEED PREDICTION UNIT
55: INK CONSUMPTION AMOUNT PREDICTION UNIT
56: RESULT DISPLAY CONTROL UNIT
57: PAGE DATA CORRECTION UNIT
100: INKJET PRINTING APPARATUS
200: CONTROL SERVER
241: RIP SIMULATION PROGRAM
300: EXECUTION SERVER
630: RIP PREDICTION SCREEN
633: LINE GRAPH
640: ANALYSIS RESULT SCREEN
650: IMAGE CONFIRMATION SCREEN

The invention claimed is:

1. A RIP simulation device that simulates RIP processing on page data including a plurality of pages in consideration of a correspondence relationship between sheets and pages when print output is actually executed, the RIP simulation device comprising:

a display unit;
an input operation unit for performing an operation on a screen displayed on the display unit;

a page data designation unit for designating page data to be simulated;

a page data analysis unit configured to analyze internal data constituting target data that is the page data designated by the page data designation unit, for a plurality of items related to RIP processing;

a RIP speed prediction unit configured to predict a RIP time for each sheet and a RIP speed when RIP processing is performed on the target data in an actual environment used when print output is actually executed, by performing RIP processing on the target data in an environment different from the actual environment; and a result display control unit configured to display a RIP prediction screen representing predicted RIP times for respective sheets or predicted RIP speeds for respective sheets on the display unit, wherein in a state in which the RIP prediction screen is displayed on the display unit, the result display control unit causes the display unit to display an analysis result screen showing an analysis result related to a page corresponding to a sheet number specified by a predetermined operation among analysis results obtained by analysis by the page data analysis unit, on a basis of a correspondence relationship between sheets and pages when print output is actually executed.

2. The RIP simulation device according to claim 1, wherein predicted RIP times for respective sheets or predicted RIP speeds for respective sheets is displayed in a predicted RIP graph on the RIP prediction screen.

3. The RIP simulation device according to claim 2, wherein in a state in which the RIP prediction screen is displayed on the display unit, the result display control unit causes the display unit to display a sheet number that corresponds to a position being on the predicted RIP graph and designated by the input operation unit.

4. The RIP simulation device according to claim 3, wherein
a sheet number displayed on the display unit can be selected by the input operation unit, and
the predetermined operation is an operation of selecting a sheet number displayed on the display unit by the input operation unit.

5. The RIP simulation device according to claim 2, wherein the RIP prediction screen displays, in addition to the predicted RIP graph, a sheet processing time graph representing a line at which RIP processing is in time for a printing speed when printing output is actually executed.

6. The RIP simulation device according to claim 1, wherein the analysis result screen shows an analysis result for each of the items.

7. The RIP simulation device according to claim 6, wherein the analysis result screen shows analysis results arranged in order of importance of the items.

8. The RIP simulation device according to claim 6, wherein in a state in which the analysis result screen is displayed on the display unit, an analysis result for each of the items can be selected by the input operation unit, and when an analysis result for any item is selected by the input operation unit, the result display control unit causes the display unit to display an image confirmation screen representing an image of a page associated with the selected analysis result.

9. The RIP simulation device according to claim 8, further comprising a page data correction unit configured to correct internal data corresponding to an image part selected by the input operation unit in a state in which the image confirmation screen is displayed on the display unit, wherein when the page data correction unit corrects the internal data, the result display control unit causes the display unit to display a RIP prediction screen based on target data before correction of the internal data and a RIP prediction screen based on target data after the correction of the internal data side by side.

10. The RIP simulation device according to claim 1, wherein the RIP prediction screen is displayed on the display unit by using a web user interface.

11. A non-transitory computer-readable recording medium recording a RIP simulation program that simulates RIP processing on page data including a plurality of pages in consideration of a correspondence relationship between sheets and pages when print output is actually executed, the RIP simulation program causing a computer, including a display unit and an input operation unit for performing an operation on a screen displayed on the display unit, to function as a page data designation unit for designating page data to be simulated;

a page data analysis unit configured to analyze internal data constituting target data that is the page data designated by the page data designation unit, for a plurality of items related to RIP processing;

a RIP speed prediction unit configured to predict a RIP time for each sheet and a RIP speed when RIP processing is performed on the target data in an actual environment used when print output is actually executed, by performing RIP processing on the target data in an environment different from the actual environment; and a result display control unit configured to display a RIP prediction screen representing predicted RIP times for respective sheets or predicted RIP speeds for respective sheets on the display unit, wherein in a state in which the RIP prediction screen is displayed on the display unit, the result display control unit causes the display unit to display an analysis result screen showing an analysis result related to a page corresponding to a sheet number specified by a predetermined operation among analysis results obtained by analysis by the page data analysis unit, on a basis of a correspondence relationship between sheets and pages when print output is actually executed.

\* \* \* \* \*